Oct. 29, 1929.  T. OTTERNESS  1,733,819
SIGNALING DEVICE
Filed May 3, 1929   2 Sheets-Sheet 1
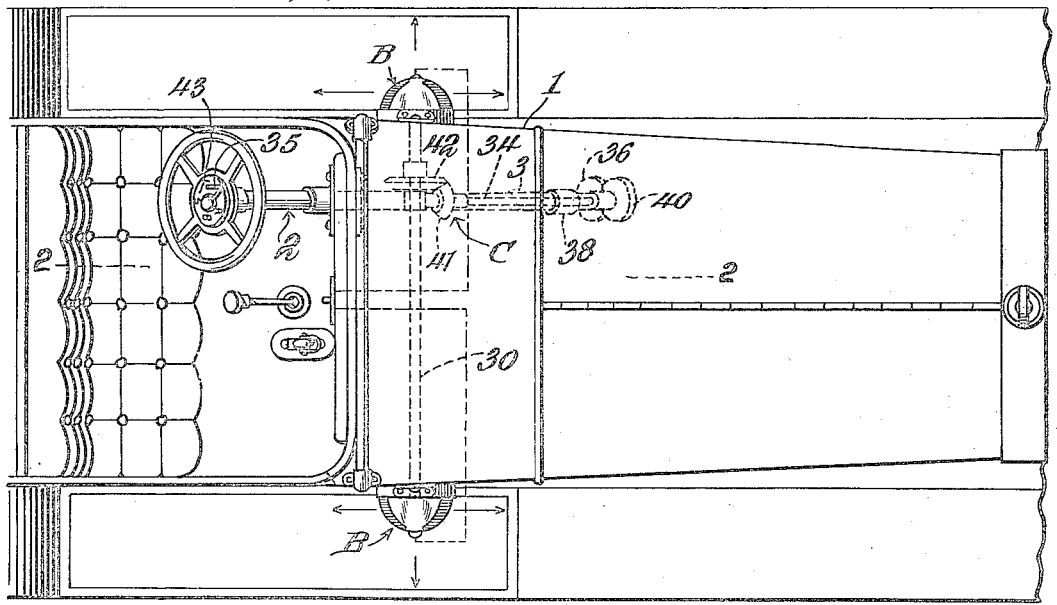
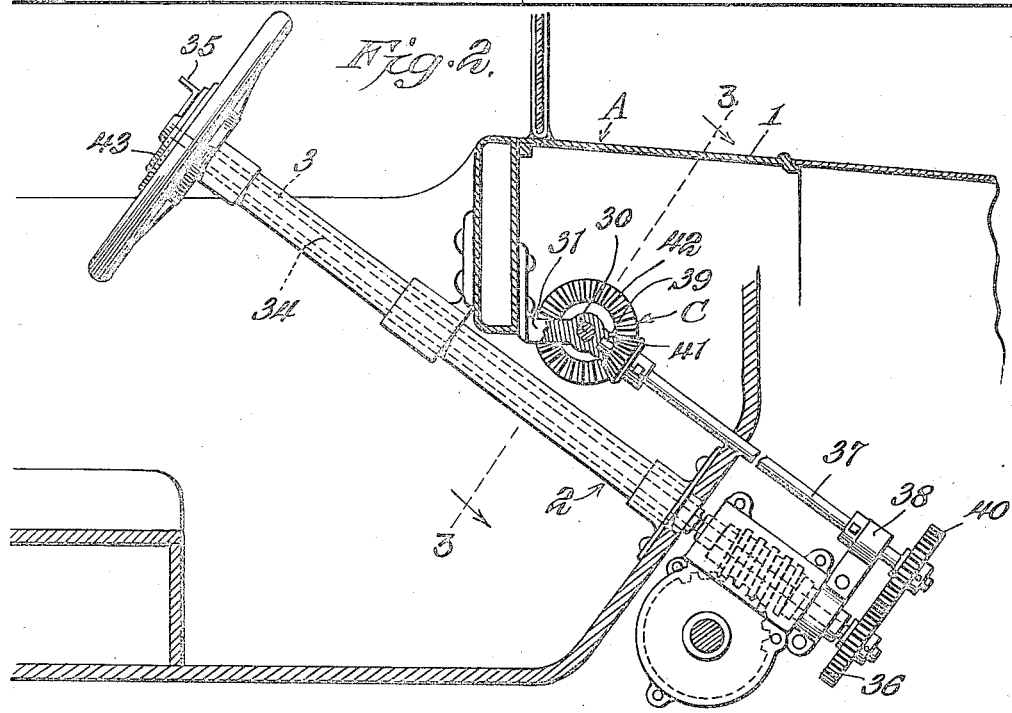
Inventor,
Thorsten Otterness,
By Pearson & Wight
Attorneys.

Oct. 29, 1929.　　　　T. OTTERNESS　　　　1,733,819
SIGNALING DEVICE
Filed May 3, 1929　　　2 Sheets-Sheet 2
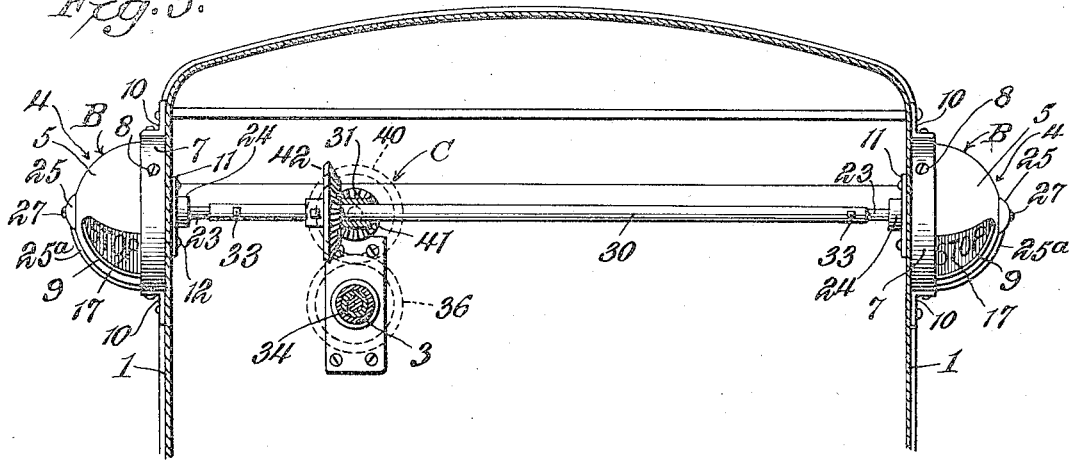
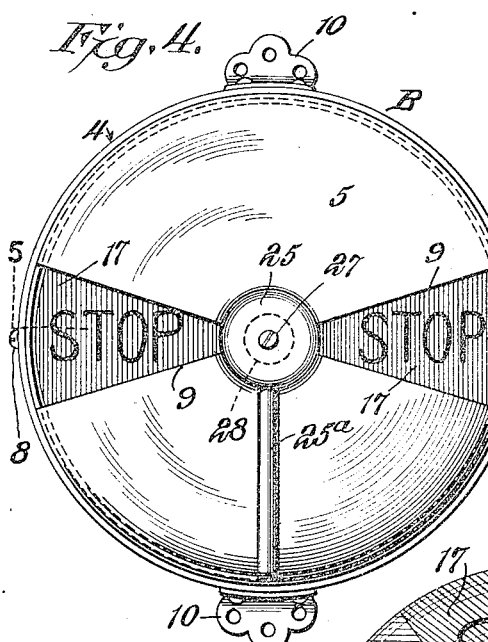
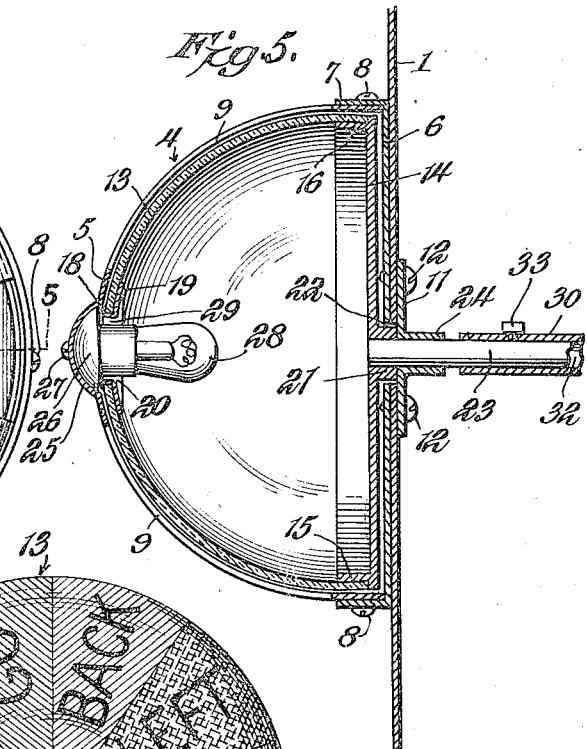
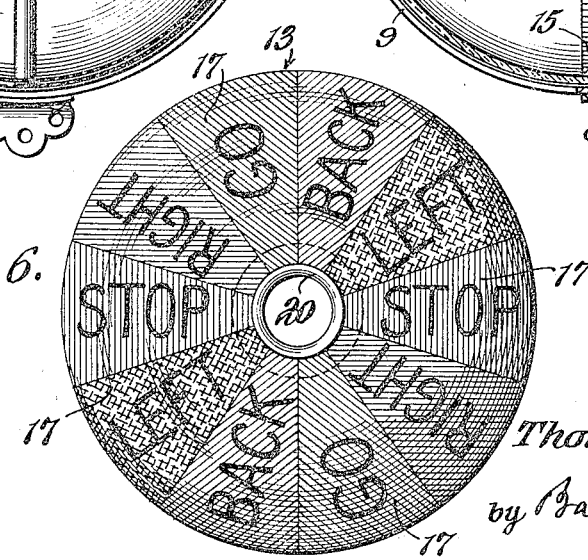
Inventor
Thorsten Otterness,
by Baldwin & Wight
Attorneys.

Patented Oct. 29, 1929

1,733,819

UNITED STATES PATENT OFFICE

THORSTEN OTTERNESS, OF FERGUS FALLS, MINNESOTA

SIGNALING DEVICE

Application filed May 3, 1929. Serial No. 360,095.

My invention relates to signaling devices, and more particularly to devices of this class which are used on vehicles for the purpose of indicating the moves to be made by a vehicle to which the device is applied, as, for instance, to indicate when the vehicle is to make a right or left turn or to start, stop, or back.

I am aware that signaling devices have previously been applied to various kinds of vehicles for the general purpose stated above, but such devices heretofore used have been of somewhat limited utility in that the displayed signals were visible from not more than two general directions. As an example, signaling devices have been provided which, when mounted on a vehicle, display signals visible from the front and rear of the vehicle, but not visible from any other direction.

According to my invention I provide an improved signaling device which, when mounted on one side of a vehicle, is visible from the front, rear, and that side of the vehicle on which the device is mounted. To further increase the scope of my improvements, the invention may also include the provision of two separate signaling devices of the general character described above mounted on opposite sides of a vehicle. By virtue of this arrangement, an observer looking towards the vehicle from any direction would see a signal displayed by one of the two devices.

From the foregoing it will be seen that the main object of my invention is to provide a signaling device which, when mounted on one side of a vehicle, will display a signal visible from the front, rear, and that side of the vehicle on which the device is mounted.

A further object is to provide conveniently located means for simultaneously actuating two of such devices which are respectively mounted on opposite sides of a vehicle.

In general, the invention includes the provision of a pair of opaque housings of generally hemispherical shape mounted on opposite sides of the vehicle body, each housing being provided with two radially and oppositely disposed openings arranged in a horizontal plane, one of the openings of each housing being visible from the front and one side of the vehicle and the other opening of each housing being visible from the rear and the same side of the vehicle. There is further provided a pair of signaling rotors, one mounted within each housing, each rotor being divided into a plurality of radially and oppositely disposed signaling sections, opposite sections being alike and adapted to register simultaneously with the respective openings in the housing in which the particular rotor is mounted. Means are also provided for actuating the rotors for changing the signals, and preferably these actuating means are conveniently located on some part of the vehicle controlling means such as a steering wheel.

With the above general outline and the above objects in view, the invention will be readily understood from a reading of the following detailed description, the appended claims, and the several views illustrated in the drawings, in which Figure 1 is a top plan view of a part of a vehicle to which my invention is applied;

Figure 2 is a fragmentary vertical sectional view taken on the line 2—2 of Figure 1;

Figure 3 is a fragmentary sectional view taken on the line 3—3 of Figure 2 looking in the direction of the arrows;

Figure 4 is an elevation of a signaling unit;

Figure 5 is a horizontal sectional view taken on the line 5—5 of Figure 4; and

Figure 6 is an elevation of a signaling rotor.

Like numerals designate corresponding parts throughout the several views of the drawings.

In the drawings my invention is illustrated as being applied to a vehicle A including a body 1 and a steering mechanism 2 having a hollow steering shaft 3 supported by the body in the usual manner.

My invention includes two signaling units, B—B which are mounted on opposite sides of the body 1 of the vehicle, and signal actuating means generally designated C which is associated with the steering mechanism so as to be conveniently accessible for changing the signals displayed by the units B.

Since the signaling units are identical, the following description of one of the units and of its mode of attachment to the body of the vehicle will suffice for both.

As shown in Figure 5, each unit includes a substantially hemispherical housing 4 including an outwardly convexed wall 5 supported on a circular base 6, the base being provided with a peripheral flange 7 embracing the wall 5. Screws 8 passing through the flange 7 and engaged with the wall 5 secure the wall to the base.

In order that signals within the housing may be visible from the exterior thereof, the curved wall 5 is provided with a pair of V-shaped radial openings 9—9 respectively located on opposite sides of the housing and arranged to extend forwardly and rearwardly of the axis of the housing when the latter is attached to the vehicle body.

For attaching each unit to the vehicle body I provide two ears 10 located on opposite sides of the housing and having legs respectively secured to the housing and to the vehicle body by any suitable means such as screws or rivets. To firmly clamp the housing to the vehicle body I provide an attaching plate 11 positioned against the inside of the body adjacent the housing, and screws 12 are passed through the attaching plate and the body, and engaged with the base 6 of the housing.

For displaying different signals through the openings in the housing there is provided a substantially hemispherical rotor 13 mounted within the housing for rotary movement with respect thereto. This rotor includes a rotatable disk 14 provided with a circular flange 15 of somewhat less diameter than the disk to thus provide an annular seat 16, in which seat are secured the inner end portions of a plurality of different translucent signaling sections 17. The outer ends of the sections are curved and fitted between upper and lower flanges 18 and 19 respectively of a metallic ring 20 which secures the sections in contacting relation to thus form a continuous curved surface disposed within and concentrically arranged with respect to the curved wall of the housing.

For mounting the rotor within the housing the disk 14 is provided with a centrally located inwardly extending hub 21 extending into an axial opening 22 conjointly formed in the base of the housing and the vehicle body, and a shaft 23, which is fixed to the hub 21, is journalled in a bearing 24 on the attaching plate 11. The hub 21 on the rotor disk is of a length to abut the attaching plate 11 and to thus maintain the rotor against axial movement toward the center of the vehicle, the attaching plate 11 serving as a thrust bearing which cooperates with the flange for performing this function.

The various different sections comprising the hemispherical surface of the signaling rotor are of equal size and are arranged in pairs of like sections disposed on opposite sides of the axis of the rotor. It will thus be seen that similar signals will be at all times displayed through the openings in the housing since in any position of the rotor corresponding like sections will register with the respective openings in the housing. These sections are preferably composed of different colored glass or other translucent material, the different colors being selected for the purpose of displaying well known signals, such, for instance, as red for "Stop", green for "Go", and yellow for "Slow". Other colors may be selected to indicate the direction the vehicle is to proceed. In addition to the color arrangement, the sections may be provided with words printed or otherwise applied thereto for indicating what move is to be next made by the vehicle.

It is desirable, of course, that the signals displayed by the units be visible at night time as well as during the day, and for accomplishing this purpose I provide illuminating means located within the signaling rotor so as to illuminate the interior thereof and to display signals through the openings in the housing visible in the dark. In the preferred form of my invention the housing is provided with an outwardly pressed portion 25 providing a seat for a socket 26 secured in the seat by means of a screw 27, and a lamp 28 mounted in the socket and extending inwardly toward the center of the housing through an opening 29 in the metallic ring 20. The outwardly pressed seat 25 is located coaxially with respect to the signal rotor so that the lamp may extend through the axial opening in the ring 20 without interfering with the movement of the rotor. The housing is also provided with an outwardly pressed channel 25$^a$ extending from the outwardly pressed portion 25 to the base of the housing for receiving a conductor connected with the socket for furnishing the lamp with electricity.

In order that like signals will be displayed in unison from both sides of the vehicle body, it is necessary that the rotors of the respective units be timed or arranged so that corresponding signaling sections of the two rotors will register simultaneously with the openings in the respective housings and that means be provided for actuating the two rotors in unison. It is to be understood that the two units mounted on opposite sides of the vehicle are symmetrically positioned and that the respective rotor shafts are in alignment. For rotating these shafts in unison there is provided a transversely disposed shaft 30 extending across the vehicle and journalled in a bracket 31 carried by the vehicle and provided at its opposite ends with recesses 32 for receiving the inwardly extending end portions of the rotor shafts 23, set screws 33 serving to maintain the rotor shafts against movement with respect to the transverse shaft 30.

The mechanism C for actuating the rotors of the respective units comprises a manually operable shaft 34 extending through the hollow steering shaft 3 and beyond each end thereof, a combined rotor actuating position indicating arm 35, and driving connections between the shaft 34 and the transverse shaft 30.

These driving connections include a gear 36 secured to the lower end of the shaft 34, a shaft 37 journalled adjacent its lower end in a bracket 38 carried by the vehicle body and journalled at its upper end in the bracket 31 as at 39, a gear 40 secured to the lower end of the shaft 37 and meshing with the gear 36, and a bevel gear 41 secured to the upper end of the shaft 37 and meshing with a bevel gear 42 secured to the shaft 30.

It will be apparent that by rotating the arm 35 the manually operable shaft 34 will, by means of the intermediate gearing provided, turn the signal rotors to bring any desired pair of signaling sections into registration with the openings of the respective housings. In order that the vehicle operator will know what signals are being displayed I provide an indicating dial 43 mounted at the upper end of the steering column and disposed below the indicating-operating arm 35. This dial is graduated and provided with indicia corresponding to the different signaling sections with which each rotor is provided, and the arm 35 is so positioned on the shaft 34 that the arm will overlie or register with that mark on the dial which corresponds to the signal being displayed. It is to be noted that, due to the arrangement of the signaling sections of the rotors in pairs of diametrically opposed similar sections, a turning of the rotors through 180 degrees, that is, through one-half of a complete revolution, will bring the same pairs of sections into registration with the housing openings as were in registration before the rotation was effected. The indicating dial is so arranged that the various indicia are spaced about the entire circumference of the dial, and for this reason, if the signaling sections are not provided with printed words but are of different colors only, it is desirable that the driving gearing be of such ratio that a complete rotation of the arm 35 will produce only one-half as great a rotary movement of the two rotors. For this reason the gears 36 and 40 are provided with equal numbers of teeth whereas the gear 41 is provided with one-half as many teeth as the gear 42. If, however, the signaling sections are provided with printed words, the gears 36 and 40 should have the same number of teeth and also the gears 41 and 42 should have equal numbers of teeth. This would provide a one-to-one gear ratio which would insure the registration of any given pair of signaling sections with the openings in the housing, for only one position of the arm 35, and it would thus be impossible for the words on the rotor to be displayed in an upside down position.

From the foregoing it will be apparent that regardless of the direction in which the arm 35 is rotated by the operator, the signals displayed will at all times correspond with the index on the dial 43 with which the arm 35 registers. This is a particular advantage since as will be readily apparent if the arm 43 were in registration, for instance, with the letter B on the dial and it were desired to move the arm to the letter R so as to display the corresponding signal the arm could be moved in a counterclockwise direction through a short distance to display the proper signal, whereas if it were desired to move the arm from the letter B to the letter S on the dial the arm could be moved in a clockwise direction through a short distance thereby avoiding the rotation of the arm through a much greater angular displacement which would be necessary if the arm could be rotated in one direction only.

The operation of the apparatus will be readily understood from the foregoing description of its construction and it is not deemed necessary to describe it further. It is apparent that a signaling apparatus constructed according to the foregoing description is most efficient in providing means for displaying signals visible from all directions. It is neat in appearance, all of the actuating mechanism being concealed with the exception of the indicating dial and the operating arm associated therewith. Moreover it is of simple construction and therefore adapted to economical manufacture.

I claim as my invention:

1. In a signaling apparatus, the combination of a substantially hemispherical housing having a wall provided with spaced openings; and a substantially hemispherical rotor mounted within the housing and provided with a plurality of pairs of radially disposed signaling sections, the sections of each pair being arranged on opposite sides of the axis of the rotor for simultaneous registration with the openings of the housing.

2. The combination with a vehicle having a body; of a pair of signaling units supported on opposite sides of the body, each unit including a housing having an outer convexed wall provided with a forwardly disposed opening visible from the front and one side of the vehicle, and a rearwardly disposed opening visible from the rear and the same side of the vehicle; and a signal rotor mounted within each housing for cooperation with said openings; and means for rotating said rotors.

3. The combination with a vehicle including a body and a hollow steering shaft; of a pair of signaling units supported on opposite sides of the vehicle body, each unit including a housing having an outer convexed wall provided with a forwardly disposed opening and a rearwardly disposed opening, and a rotor provided with a plurality of radially disposed signaling sections, the sections of each pair being alike and arranged on opposite sides of the axis of the rotor for simultaneous registration with the openings of the housing; a transversely disposed shaft supported by said body and connected to both of said rotors for rotating the latter in unison; a manually operable shaft extending through said hollow steering shaft; rotor position indicating means fixed to the upper end of the manually operable shaft; and gearing interposed between the manually operable shaft and the transversely disposed shaft, said gearing having a ratio of 1 to 2 whereby a given rotary movement of said indicating means will produce half as great a rotary movement of said rotors.

4. In a signaling apparatus, the combination with a support; of a substantially hemispherical housing mounted on the support and provided with a pair of oppositely disposed radial openings; and a substantially hemispherical signaling rotor mounted within the housing and provided with a plurality of pairs of radially disposed signaling sections, the sections of each pair being alike and arranged on opposite sides of the axis of the rotor for simultaneous registration with the openings of the housing.

5. In a signaling apparatus, the combination with a support; of a substantially hemispherical opaque housing mounted on the support and provided with a pair of oppositely disposed radial openings; a hollow substantially hemispherical signaling rotor mounted within the housing and having an axial opening and provided with a plurality of pairs of radially disposed signaling sections, the sections of each pair being alike and arranged on opposite sides of the axis of the rotor for simultaneous registration with the openings of the housing; and a lamp supported on the housing and extending inwardly through said axial opening.

6. In a signaling apparatus, the combination of a hemispherical housing provided with signal openings, an inwardly extending lamp mounted on the interior of the housing between said openings, a rotor within the housing bearing signal matter coacting with the said openings, said rotor having an opening through which the lamp projects into the interior of the rotor, a mounting means for the housing, and an operating shaft for the rotor extending through said mounting means.

7. In a signaling apparatus, the combination of a substantially hemispherical housing provided with signal openings, said housing having an outwardly pressed portion between said openings providing a socket and having an outwardly pressed channel member leading from said portion to accommodate an electric conductor, an inwardly extending lamp mounted in said socket, a rotor within the housing bearing signal matter coacting with the said openings, said rotor having an opening through which the lamp projects into the interior of the rotor, a mounting means for the housing, and an operating shaft for the rotor extending through said mounting means.

In testimony whereof, I have hereunto subscribed my name.

THORSTEN OTTERNESS.